May 20, 1958
W. W. GARDNER
2,835,285
RADIAL ARM SAW
Filed June 6, 1955
7 Sheets-Sheet 1
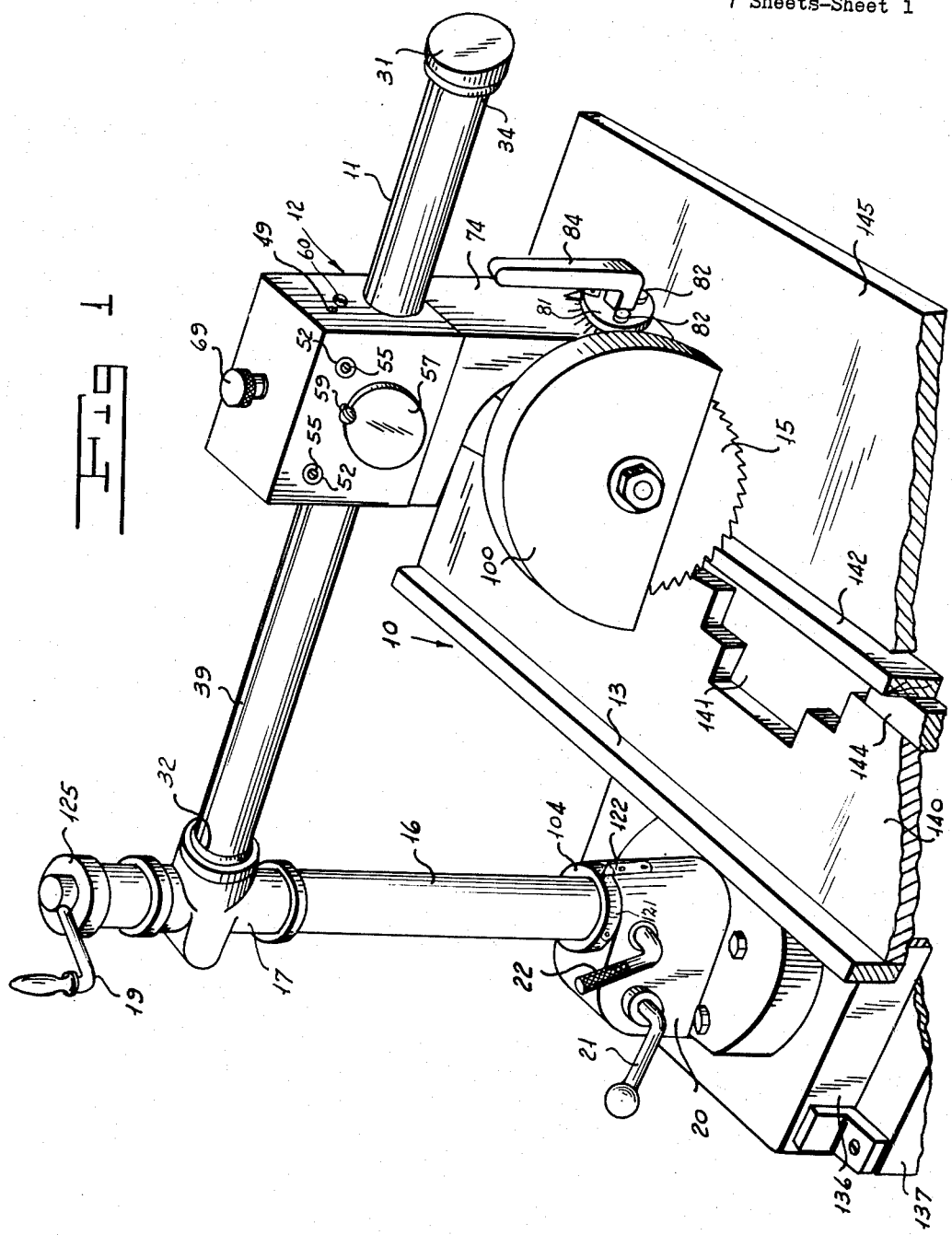
INVENTOR.
WALLACE W. GARDNER
BY
ATTORNEYS

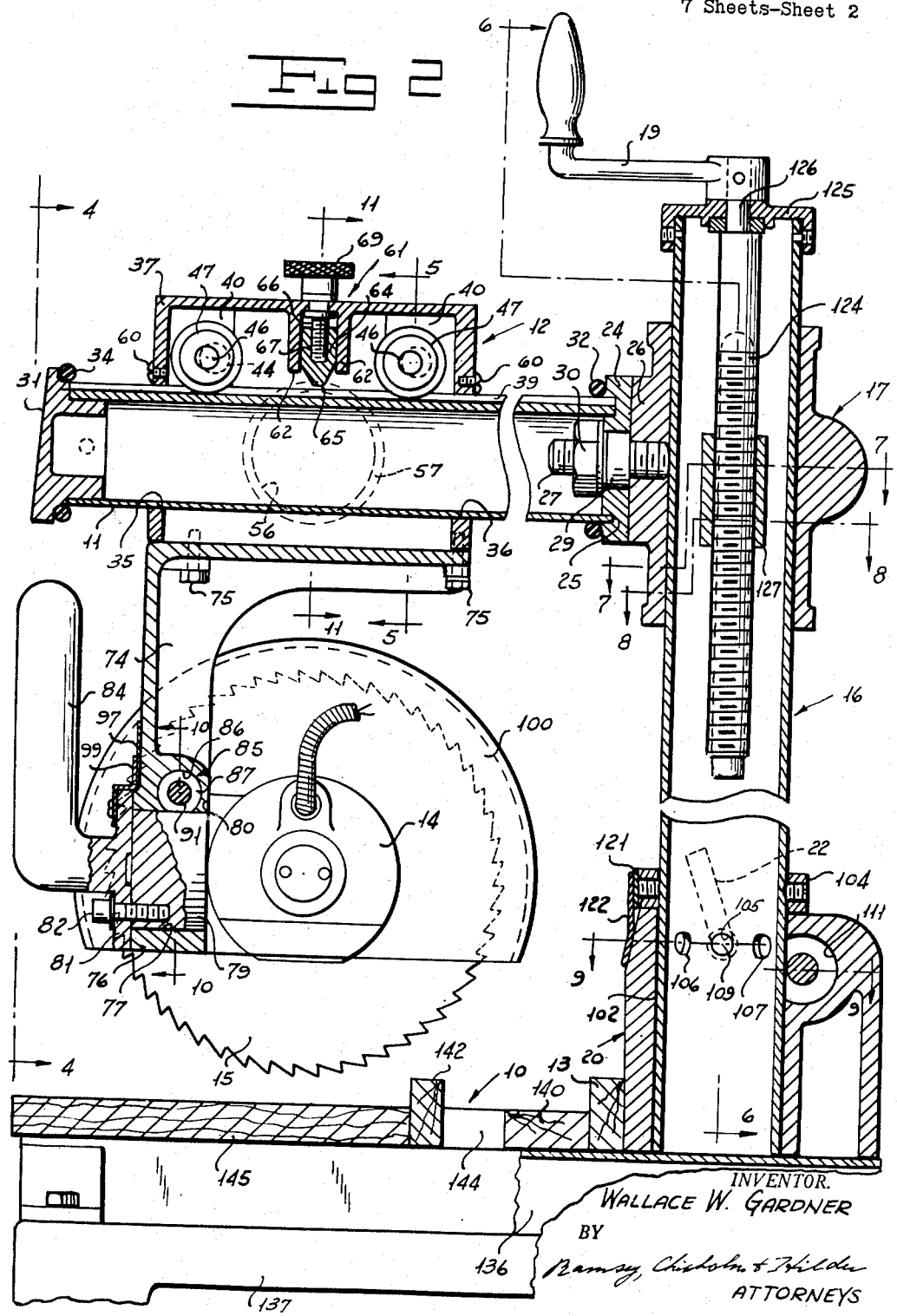

May 20, 1958 W. W. GARDNER 2,835,285
RADIAL ARM SAW
Filed June 6, 1955 7 Sheets-Sheet 3
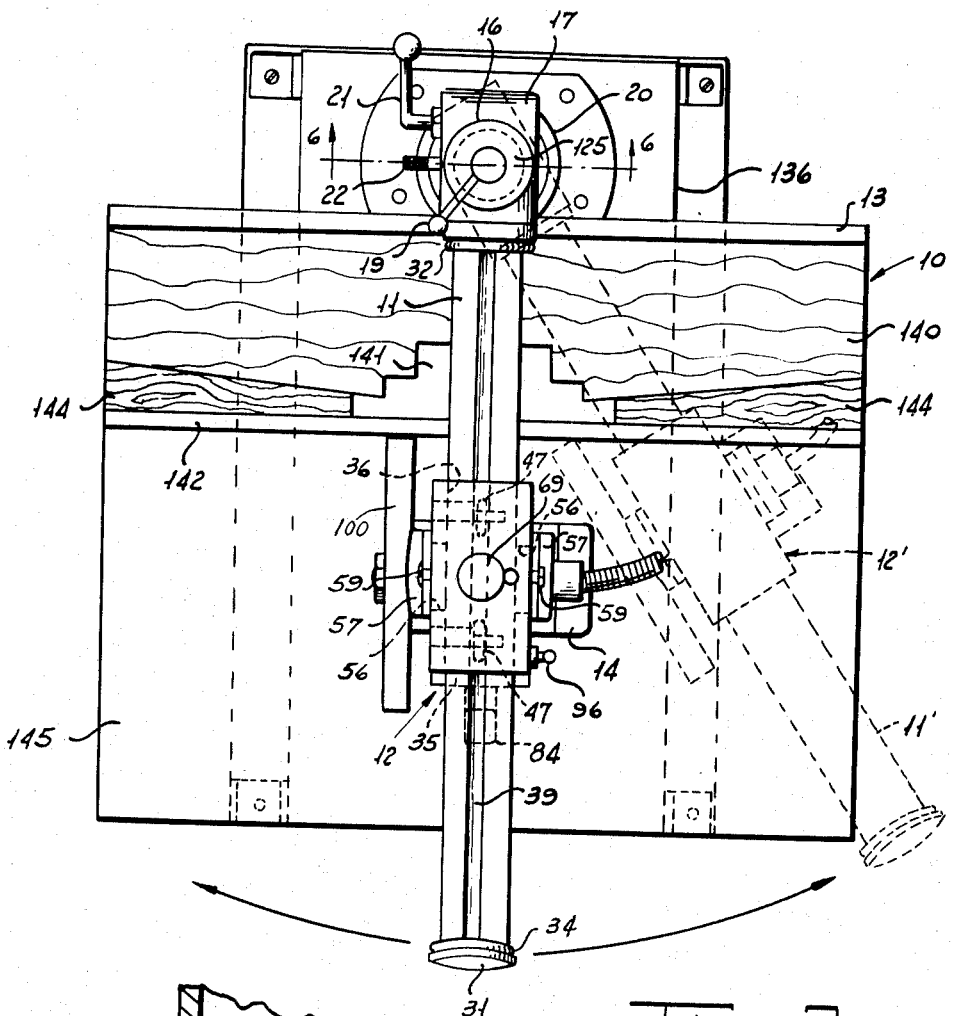
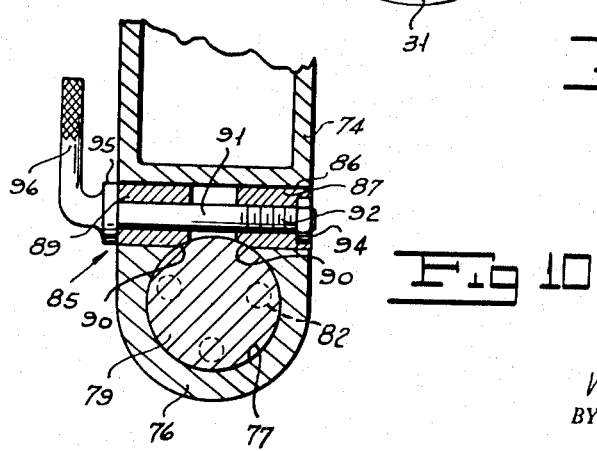
INVENTOR.
WALLACE W. GARDNER
BY
Ramsey, Chisholm & Wilder
ATTORNEYS May 20, 1958
W. W. GARDNER
2,835,285
RADIAL ARM SAW
Filed June 6, 1955
7 Sheets-Sheet 4
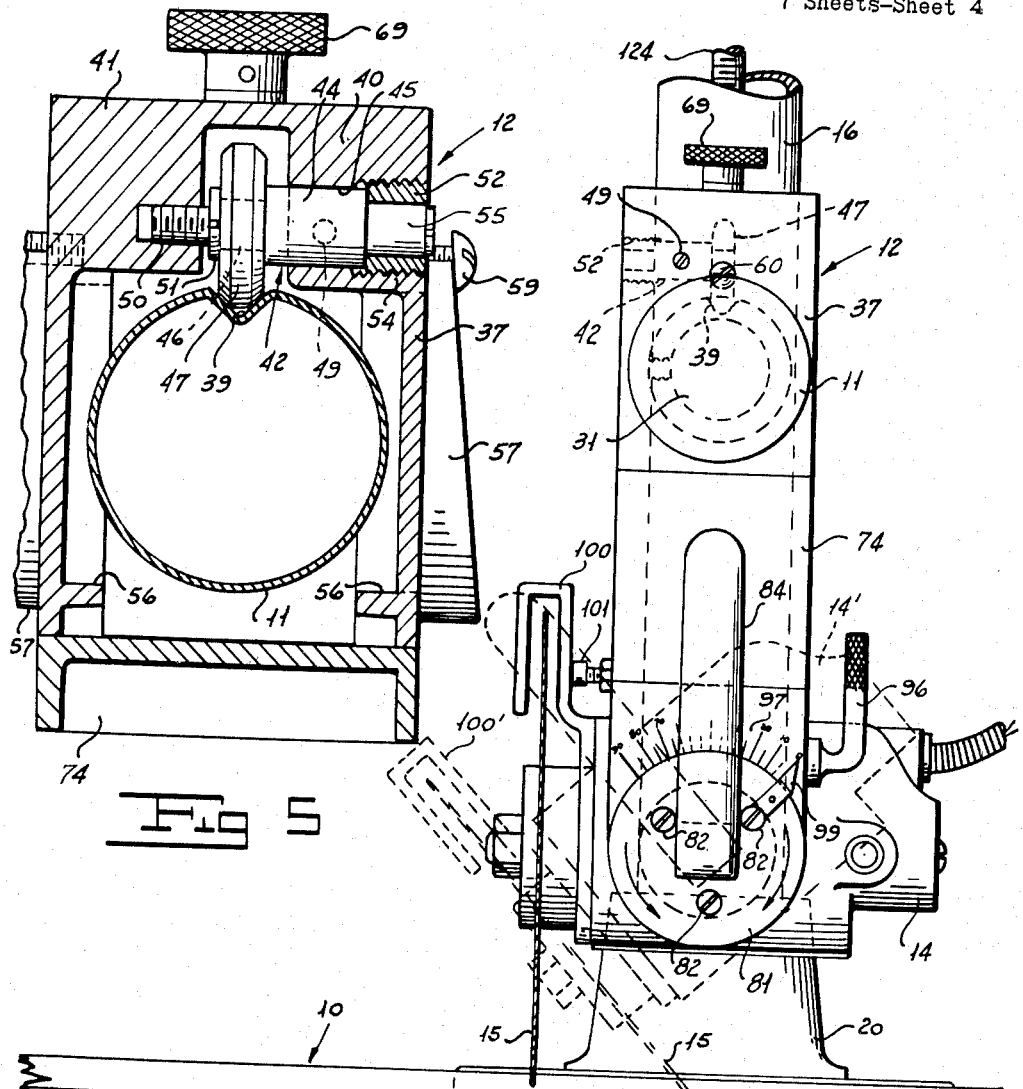
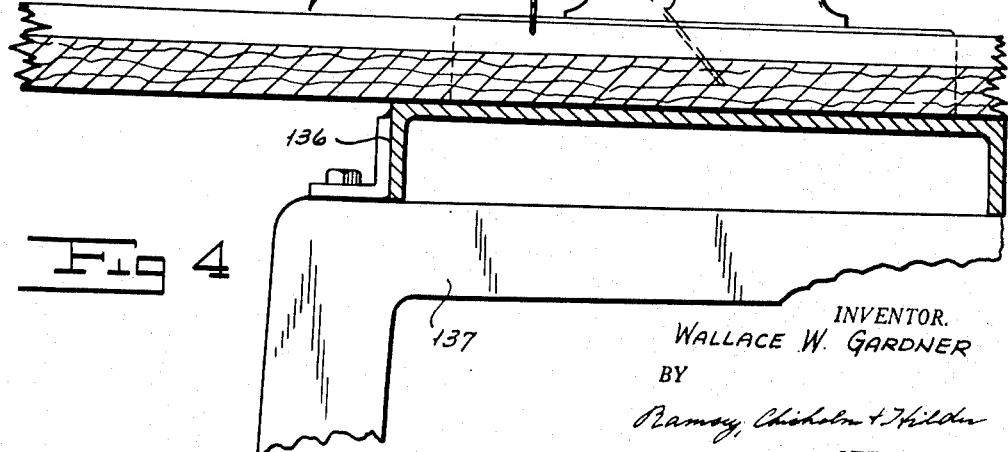
INVENTOR.
WALLACE W. GARDNER
BY
Ramsey, Chisholm & Hilder
ATTORNEYS May 20, 1958
W. W. GARDNER
2,835,285
RADIAL ARM SAW
Filed June 6, 1955
7 Sheets-Sheet 5
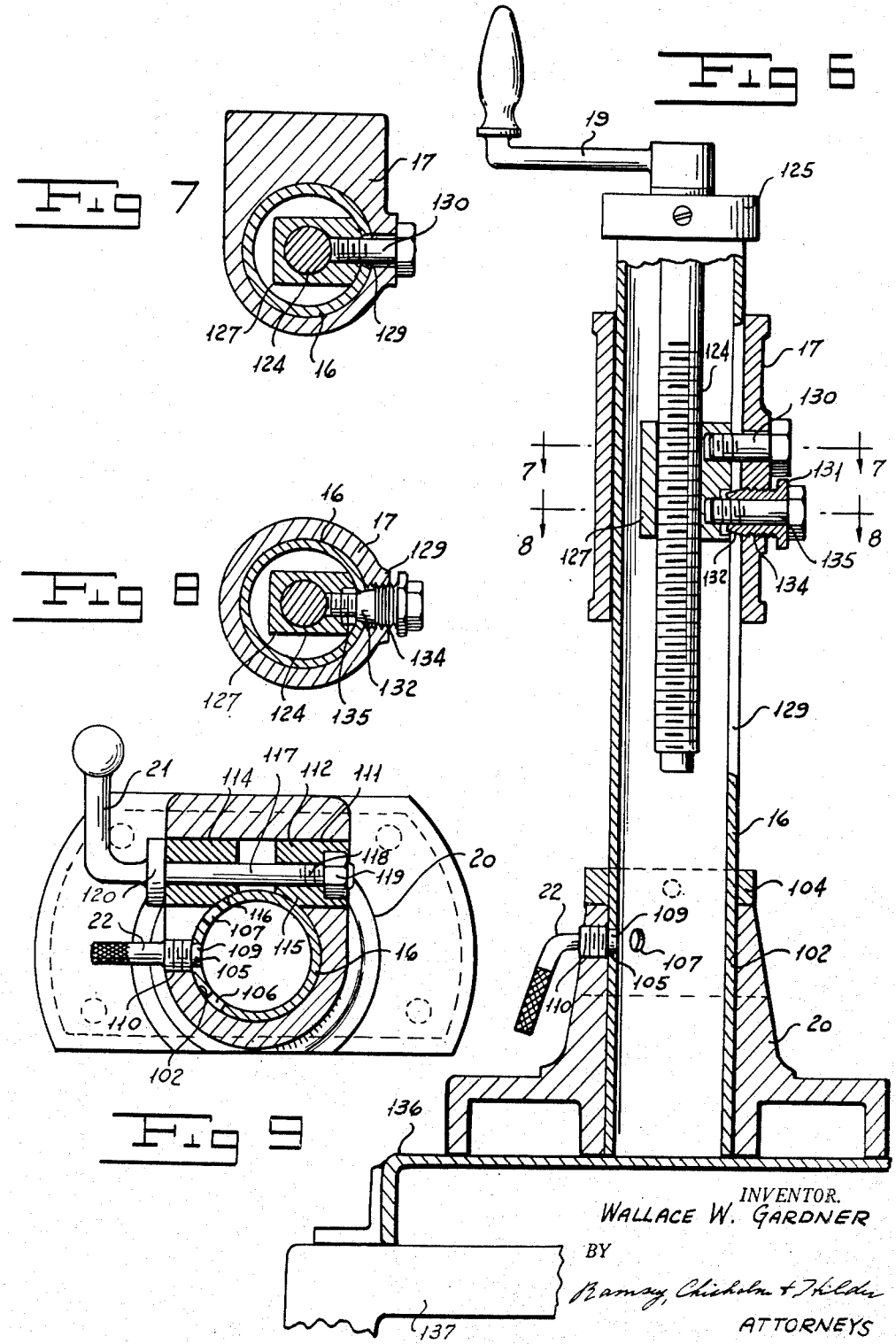
INVENTOR.
WALLACE W. GARDNER
BY
Ramsay, Chisholm & Hilder
ATTORNEYS May 20, 1958  W. W. GARDNER  2,835,285
RADIAL ARM SAW
Filed June 6, 1955  7 Sheets-Sheet 6
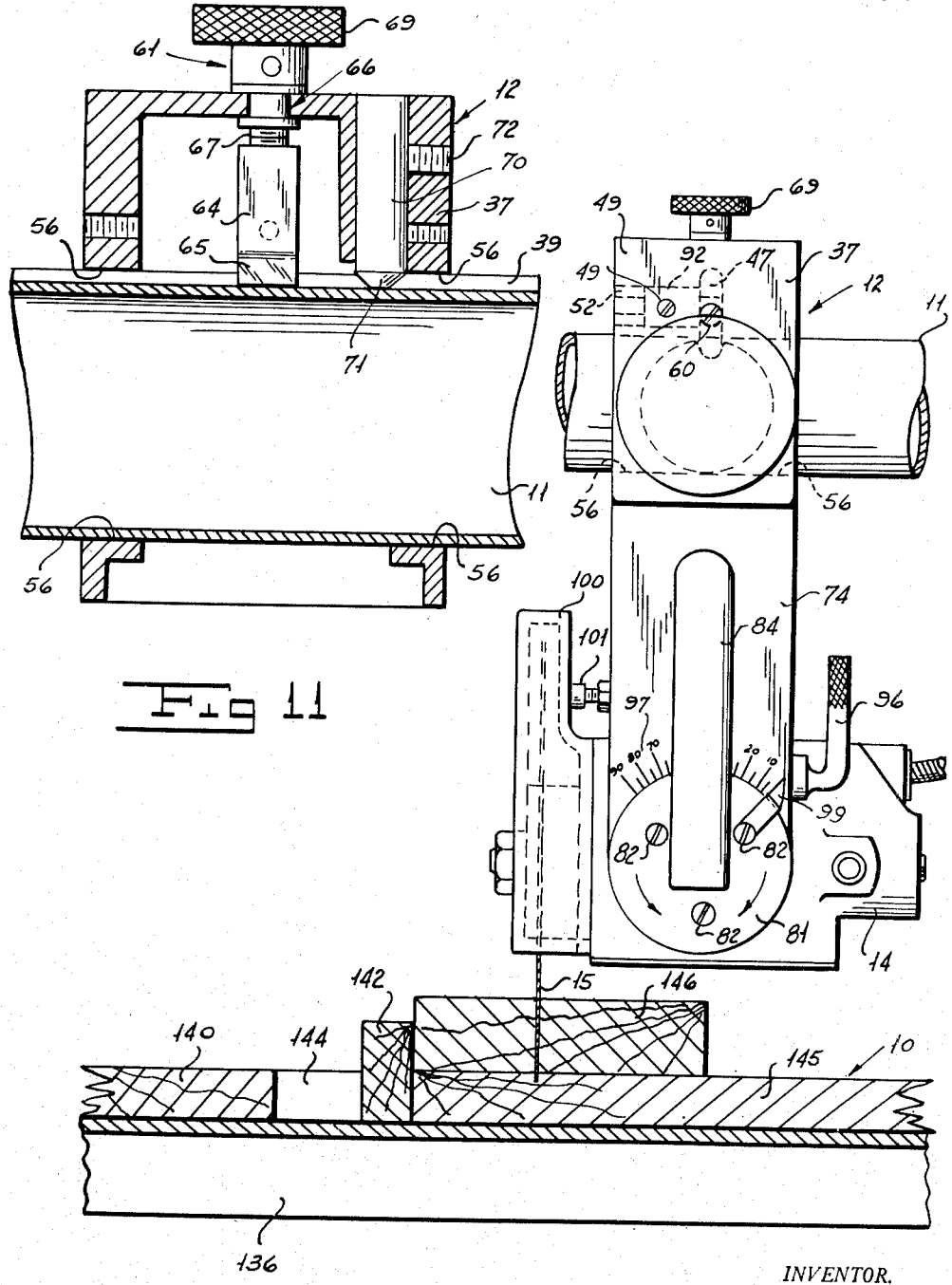
INVENTOR.
WALLACE W. GARDNER
BY
Ramsay, Chisholm & Hilder
ATTORNEYS May 20, 1958
W. W. GARDNER
2,835,285
RADIAL ARM SAW
Filed June 6, 1955
7 Sheets-Sheet 7
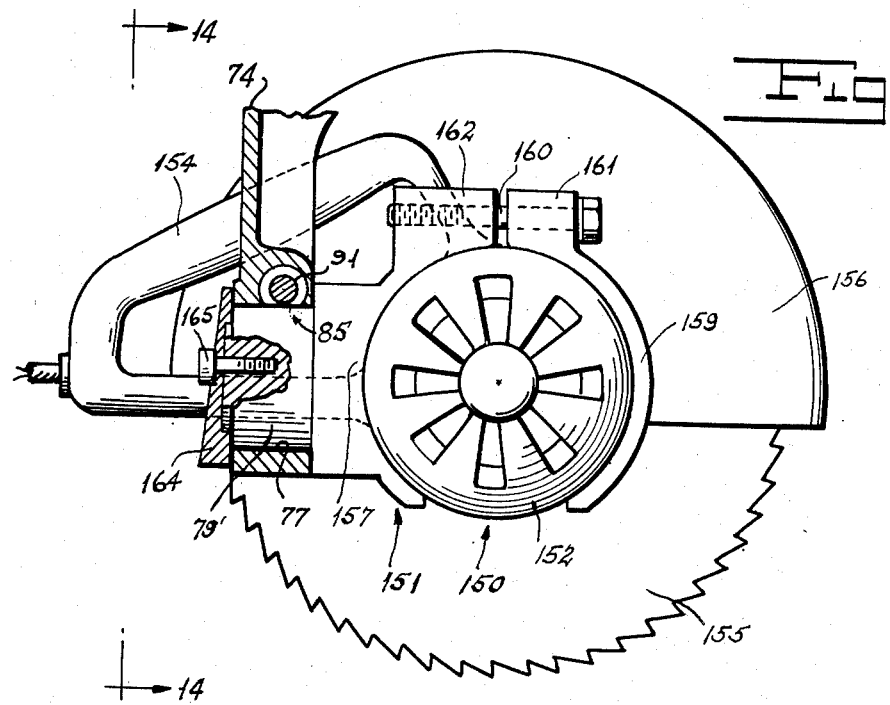
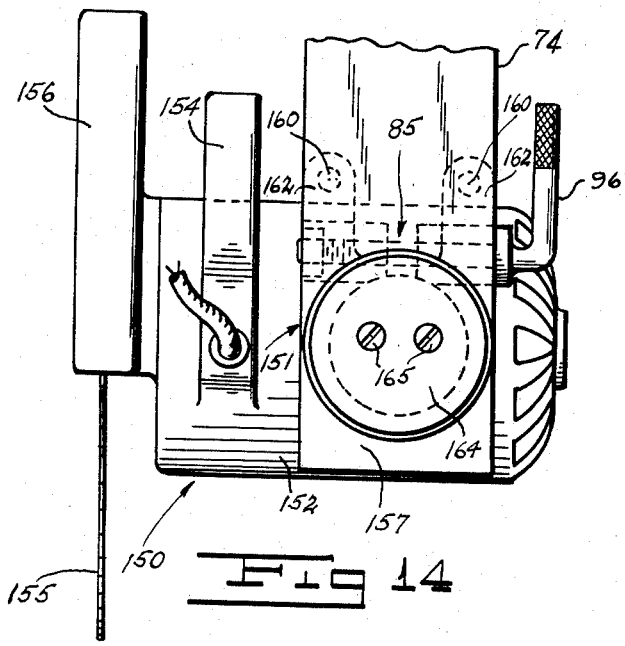
INVENTOR
WALLACE W. GARDNER
BY
Ramsey, Chisholm & Hilder
ATTORNEY

United States Patent Office 2,835,285
Patented May 20, 1958

2,835,285
RADIAL ARM SAW
Wallace W. Gardner, Glen Rock, N. J.
Application June 6, 1955, Serial No. 513,255
4 Claims. (Cl. 143—6)

This invention relates to machines that are commonly called "radial arm saws," but it is to be understood that the machine may be used for various cutting, abrading and polishing operations on various materials. Machines of this type have a vertical column, an arm suppported by the column and angularly adjustable about the column in a horizontal plane, and a motor carried by the arm for driving a rotary tool for cutting, abrading, or polishing. Some of the operations performed by the machine require the motor and the tool driven thereby to be reciprocable toward and away from the column. In carrying out the invention I prefer to mount a carriage supporting the motor and the tool for reciprocation along the arm, although in some instances the motor may be affixed to the arm and the arm mounted for reciprocation with respect to the column.

Among the objects of the invention are the provision of a simplified mount for affording reciprocation of the tool, the provision of a rugged, economical carriage and arm on which the carriage is accurately guided for straight-line movement, and the provision of an improved carriage which insures the accuracy of set-up of the tool in those operations wherein the tool-carrying motor shaft is in the "ripping" position, i. e., parallel to the axis of the arm.

Further objects of the invention include the provision of an improved rip lock and guide means coacting with the arm when the carriage is mounted thereon in the ripping position, the provision of simplified mechanism connecting the arm to the column to permit vertical adjustment of the arm while maintaining the arm from turning with respect to the column, the provision of improved mechanism for pivotally supporting and adjusting the angularity of the motor on the carriage, the provision of an improved table for cooperation with the machine in its various manners of use, and the provision, in a modification of the device, of mechanism for mounting a circular power saw, designed to be hand-held, on the carriage.

The above objects, and further objects of the invention relating to economies of use and manufacture, will be morer easily apparent from the following description.

My invention is clearly defined in the appended claims. In the claims, as well as in the description, parts may be at times identified by specific names for clarity and convenience, but such nomenclature is to be understood as having the broadest meaning consistent with the context and with the concept of my invention as distinguished from the pertinent prior art. The best modes in which I have contemplated carrying out my invention are illustrated in the accompanying drawings forming part of this specification, in which:

Fig. 1 is a view in perspective of such parts of the machine as are necessary to illustrate the invention, a portion of the work-supporting table being broken away.

Fig. 2 is a view in vertical section. The arm is in the central position shown in full lines in Fig. 3 and the general plan of the section is that of the axes of the column and the arm. The crank for adjusting the arm vertically, and the handle for traversing and angularly adjusting the motor are shown in side elevation.

Fig. 3 is a plan view of the machine, the arm being shown in full lines in its position at right angles to the work guide and being shown in dotted lines in an angularly adjusted position for an oblique cutting operation.

Fig. 4 is a fragmentary front elevation of the machine as viewed from line 4—4 of Fig. 2, the motor and the saw carried thereby being shown in full lines in position to make a vertical transverse cut, and being shown in dotted lines in position to make a 45° bevelled transverse cut.

Fig. 5 is a vertical section through the carriage and arm taken generally on the line 5—5 of Fig. 2, the one carriage-supporting roller there shown and the axle therefor being shown in elevation.

Fig. 6 is a vertical section axially of the column taken generally on the line 6—6 of Fig. 2, which is at right angles to the section of Fig. 2. Certain parts in Fig. 6 are shown in elevation.

Fig. 7 is a horizontal section through the column at an upper portion of the arm-adjusting nut within the column, the section being on the line 7—7 of Fig. 6 and the upper nut-holding stud being shown in plan.

Fig. 8 is a horizontal section through the column at a lower portion of the arm-adjusting nut, the section being on the line 8—8 of Fig. 6 and the arm-securing threaded sleeve and the lower nut-holding stud being shown in plan.

Fig. 9 is a horizontal section through the base of the column at the location of the column lock, the section being on the line 9—9 of Fig. 2 and certain parts being shown in plan.

Fig. 10 (Sheet 3) is a vertical section through the lock for the motor mounting on the carriage, the section being on the line 10—10 of Fig. 2 and the locking stud and handle being shown in elevation.

Fig. 11 (Sheet 6) is a fragmentary vertical section through the arm and carriage, the carriage being mounted on the arm in a position displaced 90° with respect to the arm from its position shown in Figs. 1–5, inclusive, to place the motor-mounted saw in ripping position. Certain parts in Fig. 11 are shown in elevation.

Fig. 12 is a fragmentary side elevation of the machine with the carriage mounted on the arm in the position shown in Fig. 11.

Fig. 13 is a fragmentary view of the lower end of the yoke bracket on the carriage with a modified motor-mounting mechanism attached to it. The motor, saw, and motor-mounting mechanism are shown in elevation. The illustrated portion of the yoke bracket and the plate retaining the motor-mounting mechanism are shown in vertical section; a portion of the motor-mounting mechanism is broken away.

Fig. 14 is a front elevation of the motor and saw of Fig. 13 from the viewpoint of line 14—14 of Fig. 13, with a fragment of the yoke bracket of the machine.

In the illustrative embodiments of the machine of the invention the motor is shown directly mounting a saw blade. The radial arm may be adjusted to position the saw for cross-cutting operations at various horizontal angles, the motor may be adjusted for cross-cutting operations at various vertical angles, and the carriage may be turned 90° with respect to the arm to position the saw for ripping operations. It will be evident that various other types of cutting, abrading, or polishing means may be substituted for the saw.

As shown in the drawings, particularly Fig. 1, the machine is provided with a horizontal table, generally designated 10, having a rear work-guide 13. A radial rail or arm 11 is positioned parallel to the surface of the table, and a motor-carrying head or carriage 12 is reciprocable along the arm when the carriage is positioned thereon in the "cross-cutting" positions shown in Figs. 1–5, inclusive. Carriage 12 supports the motor 14 (Fig. 2) which, in this instance, has the saw blade 15 mounted on the motor shaft. A vertical column 16 rises in the rear of the table and provides support for the arm 11 through the medium of the arm-supporting-and-adjusting member 17. The arm is raised from or lowered toward the table by means of the adjusting crank 19 which causes the member 17 to move up and down on the column 16. The bottom of the column is rotatably supported in the column base member 20, the column and the arm 11 mounted thereon being adjustable into various angular positions (horizontal angle) of which one angular position is shown at 11' in dotted lines in Fig. 3. The column is locked in angularly adjusted position by manipulation of the column-locking handle 21. The column may also be positively indexed to position the arm 11 at various frequently used angular positions by means of column-indexing means, the handle of which is designated 22.

The construction of the arm and of the carriage mounted thereon will be more readily understood from consideration of Fig. 2. As shown in such figure, the arm 11 is of tubular form and has connected thereto, as by welding, at its rear end the flange-like end member 24 having a central bore therethrough and provided with an annular recess 25 into which the end of the tubular arm is fitted. The flat rear face of member 24 is firmly held in face-to-face contact with the flat front face of boss 26 on arm-supporting member 17 by means of stud 27 and nut 30, the nut 30 on the stud lying within the end of the tubular arm and centrally engaging the inner face of the member 24. The collar 29 makes an accurate sliding fit with the stud 27 and with the central bore in member 24. As a result of such construction, accurate alignment of the arm 11 and the supporting member 17 is assured.

The free end of the arm 11 is provided with a removable end cap 31 which is retained on the arm by a set screw through the wall of the arm adjacent its outer end. The carriage 12 is reciprocable along the arm from adjacent its rear end to adjacent its front end. Rubber rings 32 and 34, abutting the members 24 and 31, respectively, acts as bumpers for the carriage when it reaches its limit of travel.

The carriage 12, which is in the form of a hollow casting, has front and rear openings 35 and 36, respectively, which snugly and accurately slidingly receive the arm 11. Rotatably mounted in the upper part 37 of the carriage are carriage-supporting rollers 47, 47, spaced longitudinally of the carriage as shown in Fig. 2. These rollers coact with a longitudinally extending V-shaped groove 39 (see also Fig. 5) which is disposed centrally on the upper surface of the arm 11 to insure straight-line reciprocation of the carriage in a vertical plane. The groove 39 has opposing sloping flat surfaces, as shown. Portion 37 of the carriage is provided, adjacent its front and rear ends, with thickened side wall portions 40, 41 and 40, 41, the two portions of each pair being separated by a roller-receiving slot as shown in Fig. 5. Each of the two carriage-guiding-and-supporting rollers 47 is rotatably mounted on a shaft generally designated 42 (Fig. 4), the main circular cylindrical portion 44 (Fig. 5) which is accurately and rotatably received in the bore 45 in thickened portion 40 of the carriage. The inner end of roller shaft 42 is provided with an eccentrically-positioned journal 46 which carries the roller 47. The described roller shafts allow adjustment of each roller 47 toward and away from arm 11 upon rotation of the roller shaft by means of a screw driver engaging the slotted outer end of the reduced-diameter outer shank 55. Each roller shaft is held in the desired adjusted position by means of a set screw 49 (see also Fig. 4) which extends through portion 40 of the carriage into engagement with the part 44 of the roller shaft. One set screw 49 is indicated in phantom in Fig. 5 and the other is shown in Figs. 1 and 4.

Each roller shaft 42 is forced to the left, as viewed in Fig. 5, by a threaded bushing 52, the free end of the journal 46 abutting against the head 51 of an adjusting screw 50. The length of journal 46 is such as to provide a lateral running fit for the roller 47 between screw head 51 and the end of the cylindrical shaft portion 44, free of roller side play. To adjust the roller sidewise in the carriage, the bushing 52 and shaft 42 are removed to permit insertion of a screw driver to engage the slot in screw head 51 for turning the screw 50. Then the shaft 42 and bushing 52 are replaced. Screw 50 makes a tight threaded fit with carriage portion 41 and, therefore, retains its adjusted position during usage of the machine.

The described carriage-supporting-and-guiding means is simple and positive in character, and stably supports and guides the carriage for easy smooth reciprocation of the saw in a vertical plane. The engagement between the inclined faces of each roller 47 and the inclined faces of the groove 39 in the arm is relatively extended, so that neither the rollers nor the arm is subjected to any destructive localized pressure. The extensive accurate engagement between the curved surface of the arm and the openings 35 and 36 in the carriage, which openings are substantially spaced from each other longitudinally of the arm 11, insures smooth, non-chattering travel of the carriage.

The motor 14 (see Fig. 2), for driving the saw or other rotary implement, is mounted on the lower end of a generally L-shaped yoke bracket 74 affixed to the bottom of the carriage 12 by studs 75. The lower end of bracket 74 has a central horizontal bore 77 which snugly and accurately receives a horizontal journal 79 which projects from the motor casing. An annular shoulder 80 at the root of the journal 79 abuts the rear lower face of bracket 74, the journal being held in that position by means of a retaining plate 81 which overlies the front face of the bracket and is affixed to the free end of the journal by a plurality of studs 82 (see also Figs. 1 and 12). Integral with plate 81 there is an L-shaped handle 84 by means of which the carriage 12 may be reciprocated on the arm 11 and the motor, when unlocked, may be turned on the journal 79 to vary the inclination of the motor shaft and thus of the cutting tool or other implement mounted thereon.

The journal 79 is selectively locked against rotation by locking means generally designated 85. The locking means comprises a transverse bore 86 through the lower end of the bracket 74 and partially intersecting the bore 77 as more clearly shown in Fig. 10. Positioned in bore 86 are the two confronting locking sleeves 87 and 89 each having a lower edge 90 arcuately shaped to engage the surface of the journal 79. Projecting through sleeves 87 and 89 is a stud 91 having an outer threaded end 92 received in the nut 94 which is nonrotatively positioned in a socket in the outer end of the sleeve 87. A collar 95 at the other end of the stud adjacent a handle 96 bears against the outer end of sleeve 89.

It will be apparent that when the stud 91 is rotated so as to advance it into the nut 94 the sleeves 87 and 89 will be brought into forcible locking contact with the journal 79. Rotation of the stud 91 in the reverse direction will loosen the engagement between the clamping sleeves and the journal, thereby permitting turning of the journal as required to adjust the inclination of the motor shaft. A protractor scale 97 (see also Figs. 12 and 4) is positioned on the lower end of bracket 74 and coacts with a pointer 99 affixed to the retaining plate 81. The saw blade or other tool is provided with a guard 100 enclosing virtually all of the blade except its lower cutting portion. The side of the guard 100 nearer the motor cooperates with the adjustable stud 101 (Fig. 4). This stud is so adjusted that, when the guard 100 is against the stud, the plane of the saw blade will be accurately perpendicular to the work table.

The column 16 is supported at its bottom end in the member 20 which, as shown, is connected to the table-supporting structure of the machine. The thrust collar 104 (Figs. 1, 2, and 6) on column 16 bears against the upper face of support 20 and sustains the weight of the column, arm, carriage, etc. The portion of the column 16 in the bore 102 of member 20 is provided with three holes 105, 106, and 107 which receive the rounded nose of indexing lock pin 109 when the respective holes are positioned in registration with the pin. Preferably, hole 105 is positioned at 0°, that is, is aligned with the arm 11, and holes 106 and 107 are positioned, respectively, 45° in either direction from the hole 105. The indexing means thus allows the operator positively and accurately to locate the arm in these commonly used angular positions.

The column 16 may be locked in any desired angular position by a locking means comprising two opposed locking sleeves 112 and 114 (Fig. 9) mounted in a horizontal bore 111 in member 20 and partially intersecting the bore 102 therein. Such sleeves have the respective arcuately bevelled faces 115 and 116 engaging the surface of the column. The column is locked against rotation when the stud 117 that extends through the sleeves is turned by handle 21 to advance the threaded end 118 of the stud into nut 119. The nut 119 is non-rotatively positioned in a socket in the outer end of the sleeve 112 and when stud 117 is turned into the nut, the sleeves 112 and 114 are drawn toward one another and into clamping engagement with the column 16. To unclamp the column the stud 117 is turned in the opposite direction by means of the handle 21.

A protractor 121 (Fig. 1) is secured to the periphery of the collar 104, and thus moves as the column rotates. A fixedly positioned pointer 122 supported on member 20 allows a direct reading of the angle at which the arm 11 lies with respect to its zero position perpendicular to work guide 13.

The arm 11 is supported on the column in slidable but non-rotatable relation therewith by means of the supporting sleeve member 17. A vertical screw 124 is journalled axially of the column 16 by the column cap 125 through which the neck 126 of the screw projects, and is threadedly received in the arm-adjusting nut 127 mounted within and connected to the member 17. The manner of such attachment of the nut to the sleeve member and the adjusting means therefor are best seen in Figs. 6, 7, and 8.

The column 16 is provided with a vertical, inwardly tapered, slot 129. Passing through the slot and freely slidable therein is an upper stud 130, which extends through the wall of the member 17 and is threaded into the nut 127. Below the stud 130 a sleeve member 131, which has a tapered inner end 132, is threaded into a bore in the wall of member 17. Member 131 is screwed inwardly into the member 17 until its tapered face 132 makes a snug sliding fit with the tapered side walls of the slot 129, thereby eliminating swivel movement between the member 17 and the arm 11 with respect to the column 16. The sleeve 131 is held in such adjusted position, and the nut 127 is additionally secured to the member 17, by the lower stud 135 which extends through the bore in the sleeve 31 and is threaded into the lower end of the nut 127. Should it be nesessary to take up on the engagement between the walls of the slot 129 and the nose of member 131, it is necessary only to loosen the stud 135 somewhat, screw the sleeve 131 inwardly as required, and retighten the stud 135.

The work table 10, which is best seen in Figs. 1 and 2, is supported upon an open metal framework 136 to which the column supporting member 20 is secured, the framework in turn being supported by means such as a stand 137. Table 10 has an upstanding rear longitudinally extending wooden stop member and rip guide 13. It also has a rear portion 140 centrally apertured as at 141 to permit of operations such as shaping and the like in which the motor shaft is turned to a vertical position and the rotary tool may be positioned at least partially below the upper surface of the table.

Between the forward edge of the rear table portion 140 and the rear edge of the table portion 145 there is removably positioned the upstanding auxiliary wooden rip guide 142. Guide 142 is held in position by the wedges 144 positioned between it and the correspondingly slanted edges of rear table portion 140 (Fig. 3). When it is desired to remove stop 142 it is necessary only to drive the wedges outwardly to some extent to free the stop 142, the wedges then being replaceable in order to present an extended flat surface suitable for holding the work for cross-cutting operations.

When the carriage is set up on the arm in the position shown in Figs. 1–5, inclusive, the saw blade 15 or other tool mounted on the motor is in position for cutting-off operations upon reciprocation of the carriage past a work piece held on the table. The angle of the line of cut with respect to the axis of the work piece may be varied by turning the arm and the column about the axis of the latter, as indicated in Fig. 3. The angle of the plane of the cut with respect to the vertical may be varied, as explained, by adjusting the angle of the motor shaft and thus the axis of the cutting tool with respect to the vertical, as shown in Fig. 4, for example.

The machine of the invention further provides means whereby the carriage and motor may be removed from the arm 11 and replaced thereon in a position displaced 90° from the cross-cutting position shown in Figs. 1–5. The tool may then perform ripping operations with the arm, column, and motor in the central symmetrical position thereof shown in full lines in Fig. 3. The saw blade 15 will then lie parallel with the auxiliary rip guide 142, as shown in Fig. 12 so that the work piece 146 may be ripped by being pushed past the saw.

As best seen in Figs. 1, 2, 3, 11, and 12, the carriage 12 is provided with aligned openings 56, 56 positioned substantially centrally longitudinally of its side walls, such openings normally being provided with covers 57 retained by screws 59 when the carriage is mounted on the arm in the cut-off position of Figs. 1–5, inclusive. Openings 56 are of such size as snugly and accurately to receive the arm 11, as shown in Figs. 11 and 12. When the carriage is to be mounted in rip position it is removed from the free end of the arm 11, after the members 31 and 34 have been removed from the arm, the carriage then being replaced on the arm in the position indicated in Figs. 11 and 12. The openings 56, 56 are preferably located with their common axis intersecting the common axis of openings 35 and 36. As shown in Fig. 2, the openings 56, 56 are in such position that the arm 11, when extending through them, does not contact rollers 47. When the carriage is thus mounted in ripping position it is guided longitudinally of the arm by the carriage-positioning pin 70 (Fig. 11), which has a frusto-conical lower end 71 accurately interfitting with the groove 39 in the arm and is retained on the carriage by the set screw 72. The pin 70 insures the placement of the carriage on the arm in a vertical position and the maintenance of such position during adjustment of the carriage along the arm. The carriage is maintained in the desired lateral rip-sawing or ripping position by means of the rip lock generally designated 61. The rip lock comprises a vertically adjustable rip-clamp member 64 movable vertically between the parallel depending guides 62, 62 (Fig. 2) integral with the carriage frame. The lower end 65 of member 64 is tapered to accurately interfit with the groove 39. Member 64 is vertically adjusted by the clamp screw 66 journalled in the carriage as shown, and having its threaded lower end 67 threadedly received in the member 64. The knob 69 on the outer end of the screw is provided for its rotation. Member 64 is strongly thrust downwardly into engagement with the arm 11 to maintain the carriage in the desired ripping position.

Member 64 may be elevated into an upper, inoperative position, as shown in Fig. 2, so as to clear the arm 11 when the carriage 12 is positioned on the arm in the cut-off position. If desired, the covers 57 may be mounted on the carriage to cover openings 35 and 36, when the latter is in ripping position on the arm. Screws 60 (Fig. 2) are provided on the carriage above the openings 35 and 36 to retain the covers over such openings.

Instead of using a motor and motor housing especially made for the machine, I may employ a conventional circular power saw 150, designed to be hand-held, with the mechanism generally designated 151 in Figs. 13 and 14 attaching the power saw to the yoke bracket 74 of the machine. The power saw 150 has an electric motor in a housing 152 on which is mounted the handle 154. The saw blade 155 is mounted on the motor shaft (not shown) and is hooded by the saw guard 156.

The saw mounting mechanism 151 is in the form of a motor housing embracing clamp having a front jaw 157 and a rear jaw 159 adapted to grip and rigidly hold the motor housing between them. The jaws are tightened on the motor housing by the two studs 160, 160 extending through horizontal bores in the spaced ears 161 at the top of jaw 159 and threaded into tapped bores in the ears 162 at the top of jaw 157.

Projecting forwardly centrally from jaw 157 is the horizontal journal 79' which fits snugly and accurately within the horizontal bore 77 in the lower end of yoke bracket 74. The journal is retained in the bore by the plate 164 which overlies the forward end of the bore and which is retained on the end of the journal by the two studs 165, 165 extending through the plate and threaded into the journal. The journal 79' is selectively locked against rotation by the same locking means generally designated 85, shown in Figs. 2 and 10.

The power saw mounting mechanism 151 retains the power saw 150 rigidly and accurately in its adjusted position on the machine. Whenever it is desired to use the power saw 150 as a hand-held tool, it is necessary merely to loosen studs 160, 160 to separate jaws 157 and 159 sufficiently to allow removal of the power saw 150 from mounting mechanism 151. The power saw 150 may be replaced on mounting mechanism 151 with equal ease and speed.

I claim.

1. A cutting machine comprising a horizontally extending arm cylindrical in cross section and having a longitudinally extending groove with opposing sloping surfaces located centrally of the upper surface of the arm, a carriage mounted on the arm for movement therealong, said carriage having a first set of longitudinally spaced guiding surfaces engaging the arm over at least the major portion of its section when the carriage is positioned on the arm in a first angular position with respect thereto, said carriage carrying a plurality of longitudinally spaced rollers rotatably secured to the carriage, the rollers each having a periphery with inclined faces engaging the sloping surfaces of the groove of the arm when the carriage is mounted on the arm so as to engage the first set of guiding surfaces thereon and to carry the weight of the carriage and to maintain it from rotation with respect to the arm, said carriage being removable from the arm and having a second set of longitudinally spaced guiding surfaces adapted to engage the arm over at least the major portion of its section when the carriage is positioned on the arm in a second angular position, said second set of guiding surfaces lying with their axes at right angles to that of the first set of such surfaces and so located that the arm is out of engagement with the rollers when the arm is engaged by the second set of guiding surfaces, and an adjustable clamp member positioned to enter the groove on the arm and hold the carriage from movement with respect thereto when the arm is engaged by the second set of guiding surfaces.

2. A radial saw comprising a horizontally extending circular cylindrical arm having a longitudinally extending groove V-shaped in transverse section located centrally of the upper surface of the arm, a motor-supporting carriage mounted on the arm for movement therealong, said carriage having spaced transverse end walls with bores therethrough slidably and snugly receiving the arm when the carriage is mounted on the arm in a first position, said carriage carrying a plurality of rollers spaced longitudinally of the carriage positioned adjacent the respective end wall and rotatably secured to the carriage, the rollers each having oppositely inclined side faces engaging the sloping surfaces of the groove in the arm to carry the weight of the carriage and to maintain it from rotation with respect to the arm, means mounting the rollers for adjustment radially of the arm, said carriage being removable from the arm and having spaced longitudinally extending side walls with a second set of bores therethrough slidably and snugly to receive the arm when the carriage is positioned on the arm in a second position, said second set of bores lying with their axis at right angles to and intersecting that of the first set of bores and so located that the arm is out of engagement with the rollers when the arm is received in the second set of bores, said carriage having a guiding member fixed with respect thereto which enters and accurately engages the sloping surfaces of the groove in the arm when the arm is received in the second set of bores, and an adjustable clamp member located substantially centrally of the carriage and positioned to enter the groove on the arm and hold the carriage from movement with respect thereto when the arm is received within the second set of bores.

3. In a radial saw of the type in which a motor-driven saw blade is mounted on a carriage that is pierced by and reciprocatably supported, in a particular oriented position, on a cantilever arm with the saw blade in a plane for cross cutting, the improvement which comprises: the free end of the cantilever arm being provided with a removable stop and the carriage being additionally pierced at right angles to the aforesaid piercing and being provided at such additional piercing with guiding means to mate with the arm for movement of the carriage along the arm in an oriented position at right angles to the first oriented position, and the carriage having means to lock it in selected position along the arm when it is in the second oriented position; whereby the end stop and carriage may be removed from the arm, the carriage be replaced on the arm in the second oriented position with the saw blade in a rip-sawing plane at right angles to the plane for cross-cutting, and the carriage be locked in selected rip-sawing position along the arm.

4. A radial saw as in claim 3 in which the carriage is provided with rollers that engage the arm and carry the reciprocating weight-load when the carriage is in the first oriented position, and the guiding means which mates with the arm in the second oriented position makes sliding engagement only with the arm.

References Cited in the file of this patent

UNITED STATES PATENTS

| | | |
|---|---|---|
| 1,733,518 | Snover | Oct. 29, 1929 |
| 1,850,773 | Rueger | Mar. 22, 1932 |
| 1,852,387 | Wieden | Apr. 5, 1932 |
| 1,866,888 | Hawley | July 12, 1932 |
| 1,867,275 | McCarter | July 12, 1932 |
| 2,242,336 | Atwood | May 20, 1941 |
| 2,291,999 | Wilson et al. | Aug. 4, 1942 |
| 2,353,088 | Schutz | July 4, 1944 |
| 2,522,789 | Johnson | Sept. 19, 1950 |
| 2,569,354 | Tracy | Sept. 25, 1951 |
| 2,590,119 | Osterhus | Mar. 25, 1952 |
| 2,621,686 | Tompkins | Dec. 16, 1952 |
| 2,630,146 | Van Tuyl | Mar. 3, 1953 |
| 2,630,147 | Garberg | Mar. 3, 1953 |